United States Patent
Birch et al.

(10) Patent No.: US 12,547,968 B2
(45) Date of Patent: Feb. 10, 2026

(54) INDEPENDENTLY PRESENTING STATUS OF ORDER

(71) Applicant: Google LLC, Mountain View, CA (US)

(72) Inventors: Samuel Birch, Seattle, WA (US); Benjamin Albert Azose, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/821,072

(22) Filed: Aug. 19, 2022

(65) Prior Publication Data

US 2024/0062140 A1    Feb. 22, 2024

(51) Int. Cl.
*G06Q 10/0833*    (2023.01)
(52) U.S. Cl.
CPC .............................. *G06Q 10/0833* (2013.01)
(58) Field of Classification Search
CPC .................................................. G05Q 30/0641
See application file for complete search history.

(56) References Cited

U.S. PATENT DOCUMENTS

| | | | |
|---|---|---|---|
| 8,762,290 B2 * | 6/2014 | Williams | G06Q 10/08345 705/330 |
| 2002/0138649 A1 * | 9/2002 | Cartmell | H04L 67/02 709/245 |
| 2007/0299686 A1 * | 12/2007 | Hu | G06Q 10/08 705/334 |
| 2013/0151631 A1 * | 6/2013 | Jensen | H04L 51/18 709/206 |
| 2014/0149308 A1 * | 5/2014 | Ming | G06Q 10/0833 705/333 |
| 2014/0250027 A1 * | 9/2014 | Ganesh | G06Q 10/0833 705/333 |
| 2017/0019371 A1 * | 1/2017 | Osterweil | H04L 67/568 |

FOREIGN PATENT DOCUMENTS

| | | |
|---|---|---|
| CN | 102859509 A | 1/2013 |
| CN | 112149971 A | 12/2020 |

OTHER PUBLICATIONS

Kristofer Koishigawa, How to Use HTML to Open a Link in a New Tab, Sep. 8, 2020, Retrieved from <https://www.freecodecamp.org/news/how-to-use-html-to-open-link-in-new-tab/> (Year: 2020).*
Office Action for Korean Application No. 10-2023-0102613 (with English translation), mailed Feb. 25, 2025, 20 pages.
First Office Action for Chinese Application No. 202310944390.7 (with English translation), dated Nov. 19, 2025, 30 pages.

* cited by examiner

*Primary Examiner* — George Chen
*Assistant Examiner* — Tayar M Kyu
(74) *Attorney, Agent, or Firm* — Brake Hughes Bellermann LLP

(57) ABSTRACT

A method can include identifying a tracking identifier in a HyperText Transfer Protocol (HTTP) request or response by analyzing the request or the response, storing the tracking identifier, independent of rendered browsing activity, requesting a status of an item associated with the tracking identifier, the status indicating a location of the item, receiving the status, and providing the status for display.

18 Claims, 9 Drawing Sheets

INDEPENDENTLY PRESENTING STATUS OF ORDER

TECHNICAL FIELD

This description relates to an improved user interface for tracking items.

SUMMARY

A user can visit websites and enter tracking identifiers to check the statuses of the user's orders. Visiting the websites can involve presenting a separate page to present the status of each order. Visiting the websites can indicate the shipping provider and tracking identifier, based on an address included in a web browser when the user is visiting each website. As the user is visiting the websites, a computing system can store the shipping providers and tracking identifiers associated with the orders. Independent of user request, the computing system can retrieve and present the statuses of the orders.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
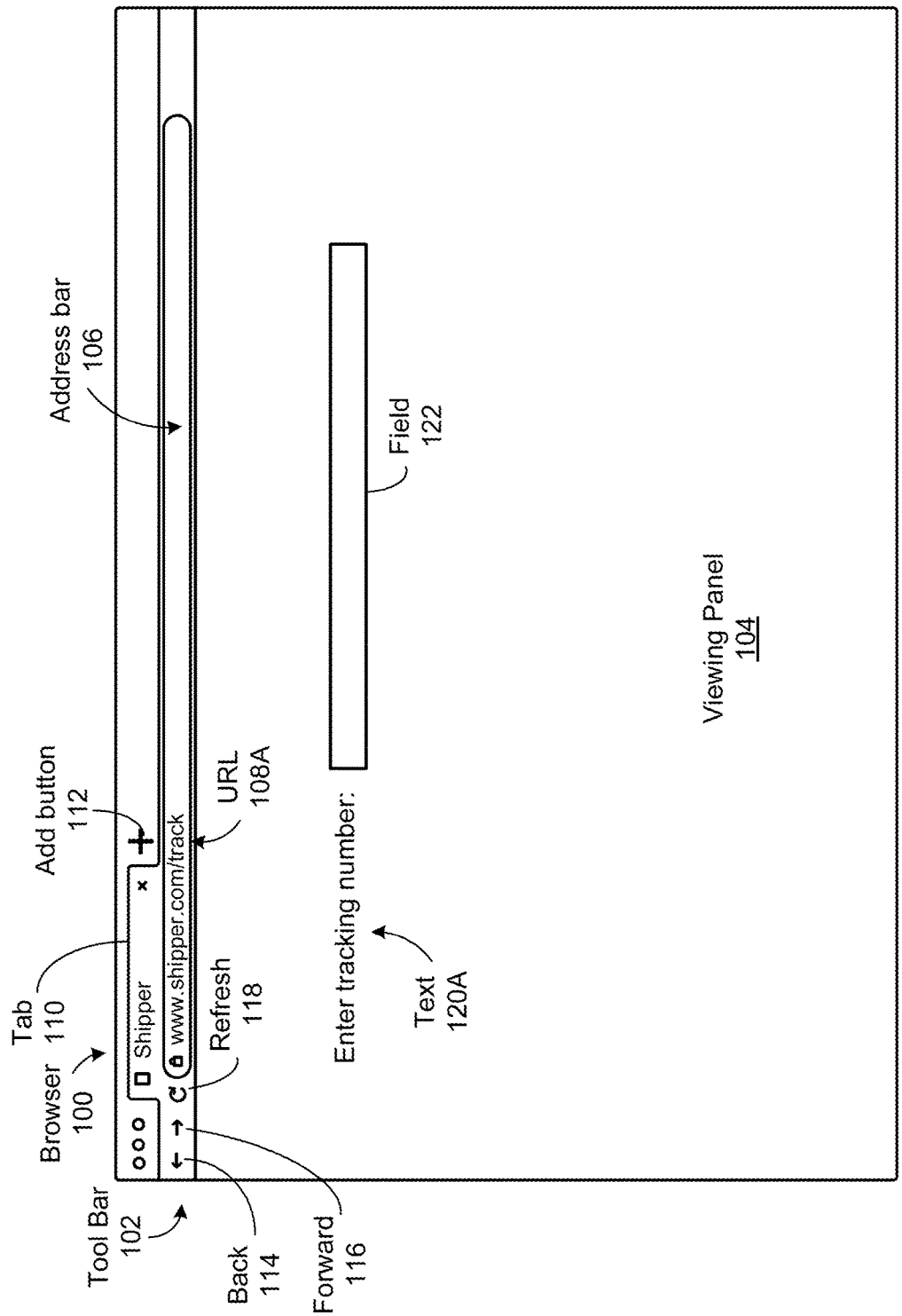
FIG. 1A shows a browser presenting a page where a user can input a tracking identifier for an item.

Users can purchase items for shipment to their homes or other locations. Users can purchase the items from the merchants' websites, or by calling the merchants on the telephone. The merchants can send and/or ship the items to the user via a third-party shipping provider. The items and/or shipments can be associated with tracking identifiers maintained by the shipping providers.

The user can visit websites associated with and/or maintained by the shipping providers and enter the tracking identifier(s). The user may have items being shipped by multiple shipping providers that maintain multiple websites. The website can, in response to entry of the tracking identifier(s), send a webpage(s) to the user. The webpage can indicate the status of the shipment. The status is an indication/description of a location of the item within the shipping process at time of the shipping inquiry. The status can include a logical location of the item, e.g., information indicating preparation for shipment, an expected delivery date, and/or an actual arrival or delivery time. The status can include a physical location of the item, e.g., the origin location, a transit check-in location, a local location (e.g., out for delivery), etc. The physical location may be a general location, e.g., identification of a city. The physical location may be specific, e.g., a particular coordinate or a radius (hundreds or thousands of feet around) around a particular coordinate, or a street address. To check the status of multiple items, the user may have to visit multiple websites and enter multiple tracking identifiers.

A web browser via which the user visits the websites and enters the tracking identifiers can store the shipping providers and tracking identifiers, reducing and simplifying user interactions with the web browser. The web browser can determine the shipping providers based on domain names entered into the web browser, and can determine the tracking identifiers based on values entered into fields and/or based on query parameters included in a Universal Resource Locator (URL). The web browser can request the statuses of the shipments and present the statuses to the user, without the user visiting the websites associated with and/or maintained by the shipping providers, and without the user having to enter the tracking identifiers. The presentation of statuses of multiple shipped items from multiple shipping providers acts as a shortcut for what would otherwise be multiple user interactions (the user visiting multiple websites maintained by multiple shipping providers and entering multiple tracking identifiers).

Further to the descriptions herein, a user may be provided with controls allowing the user to make an election as to both if and when systems, programs, or features described herein may enable collection of information (e.g., information about websites a user has visited and data the user has entered such as tracking identifiers), and if the user is presented with content (such as statuses of orders) or communications from the web browser or a remote server. In addition, certain data may be treated in one or more ways before it is stored or used, so that personally identifiable information is removed (such as information associating the user with the shipping providers, items the user ordered, and/or one or more locations to which the items are shipped). For example, a user's identity may be treated so that no personally identifiable information can be determined for the user, or a user's geographic location may be generalized where location information is obtained (such as to a city, ZIP code, or state level), so that a location of a particular user cannot be determined. Thus, the user may have control over what information is collected about the user, how that information is used, and what information is presented to the user.

FIG. 1A shows a browser 100 presenting a page where a user can input a tracking identifier for an item. As used herein, a "tracking identifier" can include any number of symbols, such as letters, numbers, punctuation marks, and/or special characters, that identifies an item being shipped, including a consignment number, shipping reference number, or an Airway Bill number (AWB) number, as non-limiting examples. The browser 100 can include a web browser that can open Internet connections with servers and request content. The server can respond with the requested content. The browser 100 can read the content received from the server and render and/or display the content on a screen and/or display of a computing system on which the browser 100 is executing.

The browser 100 can include a tool bar 102. The tool bar 102 can receive input from a user. The tool bar 102 can include an address bar 106. The address bar 106 can include a field that receives text input, such as a Universal Resource Locator (URL) 108A or a search query. The browser 100 can respond to text input by presenting content received from a remote computing device, and associated with the URL or the search query, within a viewing panel 104.

Figure 1B:
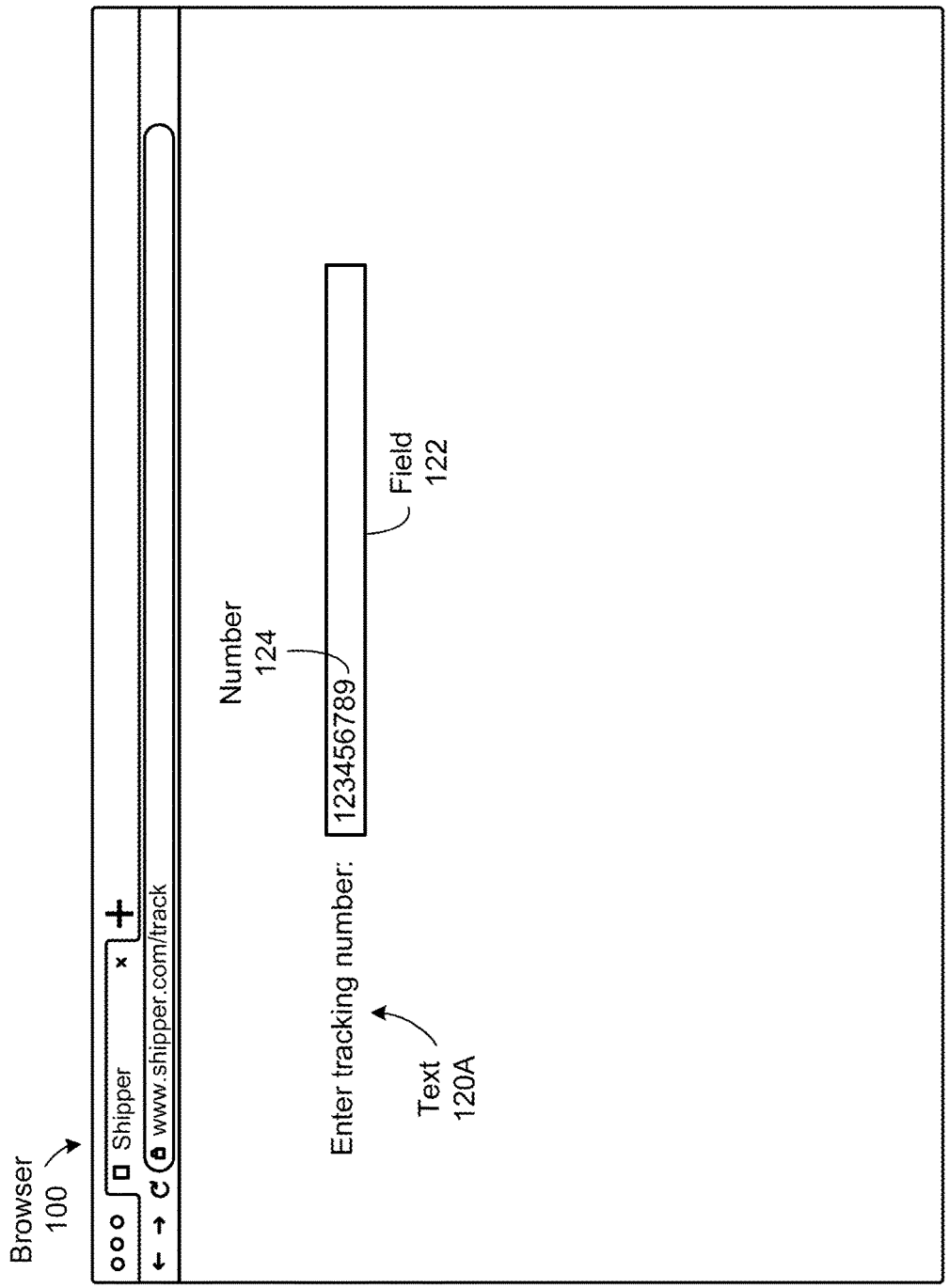
FIG. 1B shows the browser of FIG. 1A presenting the page after the user has inputted the tracking identifier.
Figure 1C:
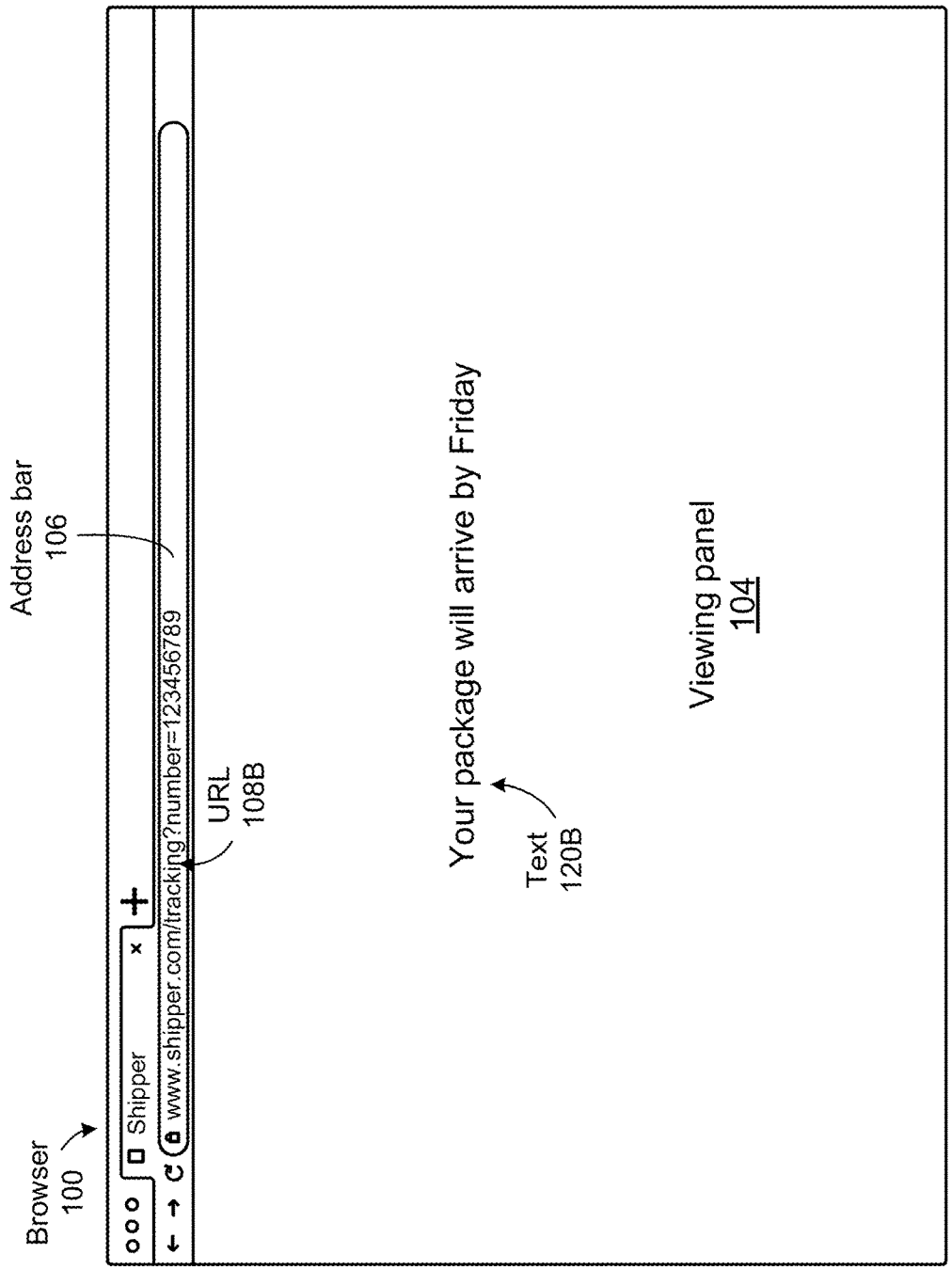
FIG. 1C shows the browser of FIGS. 1A and 1B presenting a page with a shipping status of the item associated with the tracking identifier.

In the example shown in FIG. 1A, the user has entered, and/or visited, the URL 108A, "www.shipping.com/tracking". The portion of the URL 108A, "shipping.com", identifies the domain and/or website maintained by/associated with a shipping provider. The browser 100 can initiate a HyperText Transfer Protocol (HTTP) request (such as a "GET") that includes the URL 108A as a request header. The browser 100, and/or a computing system in communication with the browser 100, can check the domain (e.g., "shipping.com") in the address bar 106 against a list of known shipping providers maintained by the browser 100 and/or computing system in communication with the browser 100. In some examples, the browser 100 and/or computing system in communication with the browser 100 can check the domain in the address bar 106 against, and/or compare the domain to, the list of known shipping providers in response to the user entering a tracking identifier 124 as shown in FIG. 1B. In some examples, the browser 100 and/or computing system in communication with the browser 100 can check the domain in the address bar 106 against the list of known shipping providers in response to the browser receiving content (such as the status of the order) from the server maintained by the shipping provider, as shown in FIG. 1C.

The portion of the URL, "/tracking", identifies a subdirectory and/or subfolder maintained by the server. In this example, the subdirectory and/or subfolder is a subdirectory and/or subfolder that maintains statuses of shipments. The "www" portion of the URL 108A indicates that the page rendered in the viewing panel 104 of the browser 100 is part of the set of linked hypertext documents forming the World Wide Web that can be viewed on a web browser, such as the browser 100.

The tool bar 102 can include a back button 114. The browser 100 can respond to the user selecting the back button 114 by returning the address bar 106 and viewing panel 104 to a previous page. The tool bar 102 can include a forward button 116. The browser 100 can respond to a user selecting the forward button 116 by returning the address bar 106 and viewing panel 104 to a page in an opposite direction within a navigation hierarchy as the back button 114. The tool bar 102 can include a refresh button 118. The browser 100 can respond to a user selecting the refresh button 118 by requesting content associated with the URL 108A included in the address bar 106 and rendering the content in the viewing panel 104.

The browser can include a tab 110. The tab 110 can be associated with the URL 108A and content presented in the viewing panel 104. The tab 110 can indicate the content presented on the viewing panel 104. In this example, the tab 110 indicates "Shipper," identifying the shipping provider maintaining the website. The browser 100 can also include an add button 112. The browser 100 can respond to the user selecting the add button 112 by creating an additional tab, enabling the browser 100 to maintain pages associated with multiple URLs.

The viewing panel 104 can, based on content received from the server based on the URL 108A, present text 120A and a field 122. In this example, the text 128 includes, "Enter Tracking Number:", prompting the user to enter a tracking identifier associated with a shipment into the field 122. The field 122 can include a text field that receives textual input from a user and sends the textual input to the server that maintains the website associated with the URL 108A.

FIG. 1B shows the browser 100 of FIG. 1A presenting the page after the user has inputted the tracking identifier 124. The browser 100 presents the rendered page in the viewing panel 104 based on content received from the server associated with the URL 108A. In this example, the user has entered the tracking identifier 124, "123456789", into the field 122. In response to receiving the tracking identifier (and optionally the user selecting a control to indicate the tracking identifier is complete), the browser 100 sends the tracking identifier 124 to the server associated with the URL 108A, e.g., as a query to the server. This query may be issued as an HTTP request (e.g., a "GET") that includes the tracking identifier as a query parameter. The HTTP request may include a URL similar to URL 108B in a request header. In some examples, as part of issuing the request, the browser 100 can be configured to analyze the URL to identify the tracking identifier and the shipping provider (e.g., via a domain in the URL).

FIG. 1C shows the browser 100 of FIGS. 1A and 1B presenting a page with a shipping status of the item associated with the tracking identifier. In this example, the URL 108B included in the address bar 106 has been updated based on the request (the query) associated with the entry of the identifier 124 into the field 122. The URL 108A has been appended with, "?number=123456789", to generate the URL 108B shown in FIG. 1C. In some examples, as part of receiving the HTTP response to the HTTP request, the browser 100 can be configured to analyze the URL (e.g., the URL 108B) to identify the tracking identifier and the shipping provider. Thus, implementations include a browser 100 that is configured, with user permission, to intercept either a requested URL (e.g., as part of an HTTP request) or a provided URL (e.g., as part of an HTTP response) and analyze the URL to identify a tracking identifier and shipping provider.

The appendage, "?number=123456789", includes a special character, in this example a question mark ('?'), indicating that a URL parameter follows the special character. The appendage includes a key, "number", and a value, "123456789", separated by an equal sign ('='). The key indicates the name of the variable (the tracking identifier) in the parameter, and the value indicates the value of the variable (which was entered by the user as shown in FIG. 1B).

In some examples, the computing system on which the browser 100 is executing, and/or another computing system in communication with the browser 100, can analyze the URL, e.g., URL 108B, to determine whether the URL includes a question mark indicating that a URL parameter follows, and determine whether the domain included in the URL 108B (such as "shipping.com" in the example shown in FIG. 1C) is included in a list of shipping providers stored by the computing system on which the browser 100 is executing and/or a computing system with which the browser 100 is executing. If the domain included in the URL 108B is included in the list of shipping providers, the computing system on which the browser 100 is executing and/or a computing system with which the browser 100 is in communication can, based on the domain being included in the list, store the value in association with the shipping provider and in association with the user. In some examples, the computing system can, after determining that the domain included in the URL 108B is included in the list of shipping providers and before storing the value, determine that the value matches a pattern associated with the shipping provider (such as having a predetermined number of digits or having a hash value associated with the shipping provider after being processed through an algorithm associated with the shipping provider). The computing system can determine whether the value or the URL as a whole matches a pattern by checking whether the value or the URL matches a pre-stored regular expression that is representative of the pattern for querying specific tracking information of a specific shipping provider. Based on a match with the regular expression, the computing system may determine that the value or the URL corresponds to a request for tracking information of a specific delivery of this specific shipping provider. Multiple regular expressions, which may respectively correspond to different shipping providers, may be prestored and matched by the computing system against a certain value or a certain URL to determine whether the URL corresponds to a tracking request. In some examples, the computing system can store the value based on the domain being included in the list and the value matching the pattern associated with the shipping provider.

In some examples, the list of shipping providers and associated domains can be generated manually by a user or administrator entering domains and names of shipping providers. In some examples, the list of shipping providers and associated domains can be generated semi-automatically based on a user or administrator tagging pages that have tracking information via a browser extension. In some examples, the list of shipping providers and associated domains can be generated automatically by a computer function that reviews the content of webpages in a search index and retrieves the domains and names of webpages that appear to include tracking information. In some implementations, the regular expressions, which may be used by the computing system to determine whether a URL or a value in a URL corresponds to a tracking request, may be generated by the computing system manually based on input from a user or administrator analyzing pages that have tracking information and generating based on the one or more regular expressions. In some implementations, the computing system can employ a semi-automatic approach for identifying tracking requests by using a machine learning model, which uses URLs as training input, which have been tagged as being tracking requests, for example based on a manual analysis by users.

The computing system on which the browser 100 is executing, and/or a computing system in communication with the browser 100, can perform the actions and/or functions described above multiple times. The computing system on which the browser 100 is executing, and/or a computing system in communication with the browser 100, can store multiple tracking identifiers in association with one or multiple shipping providers (a single shipping provider can be associated with multiple tracking identifiers). The shipping providers can be associated with domains (such as "shipper.com" in the example of FIGS. 1A. 1B, and 1C).

Figure 2:
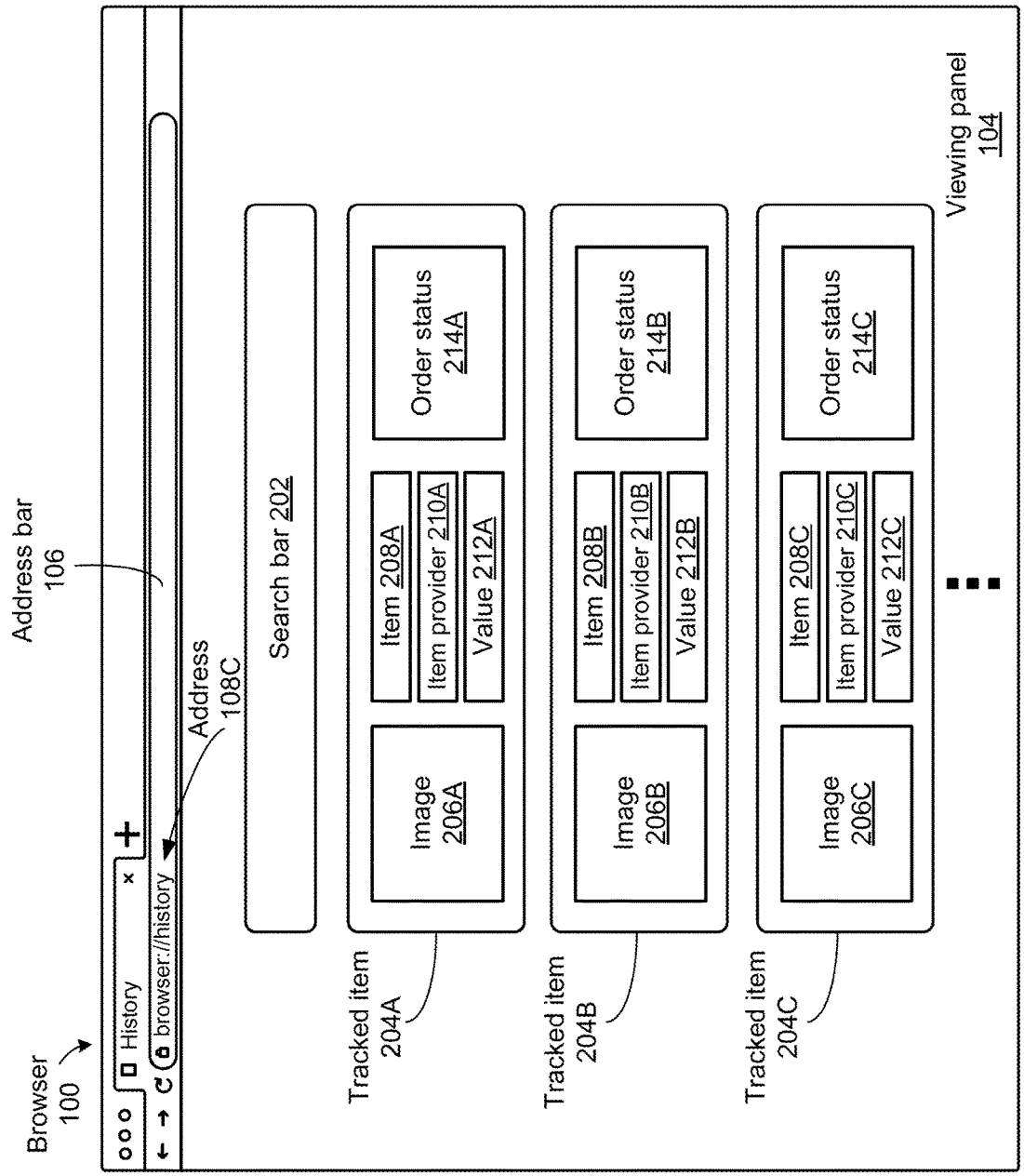
FIG. 2 shows a browser presenting statuses of multiple items.

FIG. 2 shows the browser 100 presenting statuses of multiple items 204A, 204B, 204C. The browser 100 can have similar features and/or functionalities as described with respect to FIGS. 1A, 1B, and 1C. The items 204A, 204B, 204C can be items for which the user checked the status by requesting statuses from the websites maintained by the shipping providers, as described above. The browser 100 can present the statuses in response to a trigger, such as launching the browser, launching a new browser window, or opening a new tab on the browser (such as in response to the user selecting the add button 112 described above).

The address bar 106 can include an address 108C. In some examples, the address 108C can identify a location in a memory, accessible to the browser 100 and/or computing system, that includes information about tracked shipments that are stored by the browser 100 and/or a computing system in communication with the browser. In some examples, the address 108C can identify a data store such as a file or database. In some examples, the address 108C can include a domain associated with a remote website that stores information about the tracked shipments.

The browser 100 can include a search bar field 202. The search bar field 202 can receive text input from a user. The browser 100 can respond to the text input into the search bar field 202 by searching tracked items for a term included in the text input, and/or a term similar to the term included in the text input.

The browser 100 can present one or more tracked items 204A, 204B, 204C in the viewing panel 104. The tracked items 204A, 204B, 204C can be items for which the browser 100, and/or a computing system in communication with the browser 100, stored a tracking identifier (such as the tracking identifier 124 included in the URL 108B) in association with a shipping provider. For each tracked item 204A, 204B, 204C, the browser 100 can present any combination of an image 206A, 206B, 206C of the item, a textual description of the item 208A, 208B, 208C, an item provider 210A, 210B, 210C (such as a shipper or seller) of the item, and/or a value 212A, 212B, 21C (such as a price or other attribute) of the item. The browser 100 may have determined and/or retrieved the images 206A, 206B, 206C, textual descriptions of the items 208A, 208B, 208C, item providers 210A, 210B, 210C, and/or values 212A, 212B, 212C based on emails associated with the user of the browser 100 and/or websites visited by the user of the browser 100.

For each tracked item 204A, 204B, 204C, the browser 100 can present an order status 214A, 214B, 214C. The order status 214A, 214B, 214C can indicate the shipping status of the tracked item 204A, 204B, 204C. The order status 214A, 214B, 214C can indicate, for example, whether the tracked item 204A, 204B, 204C has been delivered, a date that the tracked item 204A, 204B, 204C is expected to be delivered, or that the shipment and arrival estimate are in process.

The computing system on which the browser 100 is executing, and/or a computing system in communication with the browser, can determine the order statuses 214A, 214B, 214C by requesting and/or inquiring the order statuses 214A, 214B, 214C from servers maintaining the order statuses 214A, 214B, 214C, such as the servers maintaining the websites where the user originally checked the order statuses 214A, 214B, 214C (as shown in FIGS. 1A, 1B, and 1C). The computing system on which the browser 100 is executing, and/or a computing system in communication with the browser, can, for example, send the respective tracking identifiers to the respective servers maintaining the respective websites, receive the order statuses associated with the respective tracking identifiers, and provide the order statuses to the browser 100 for presentation to the user as shown in FIG. 2.

Figure 3:
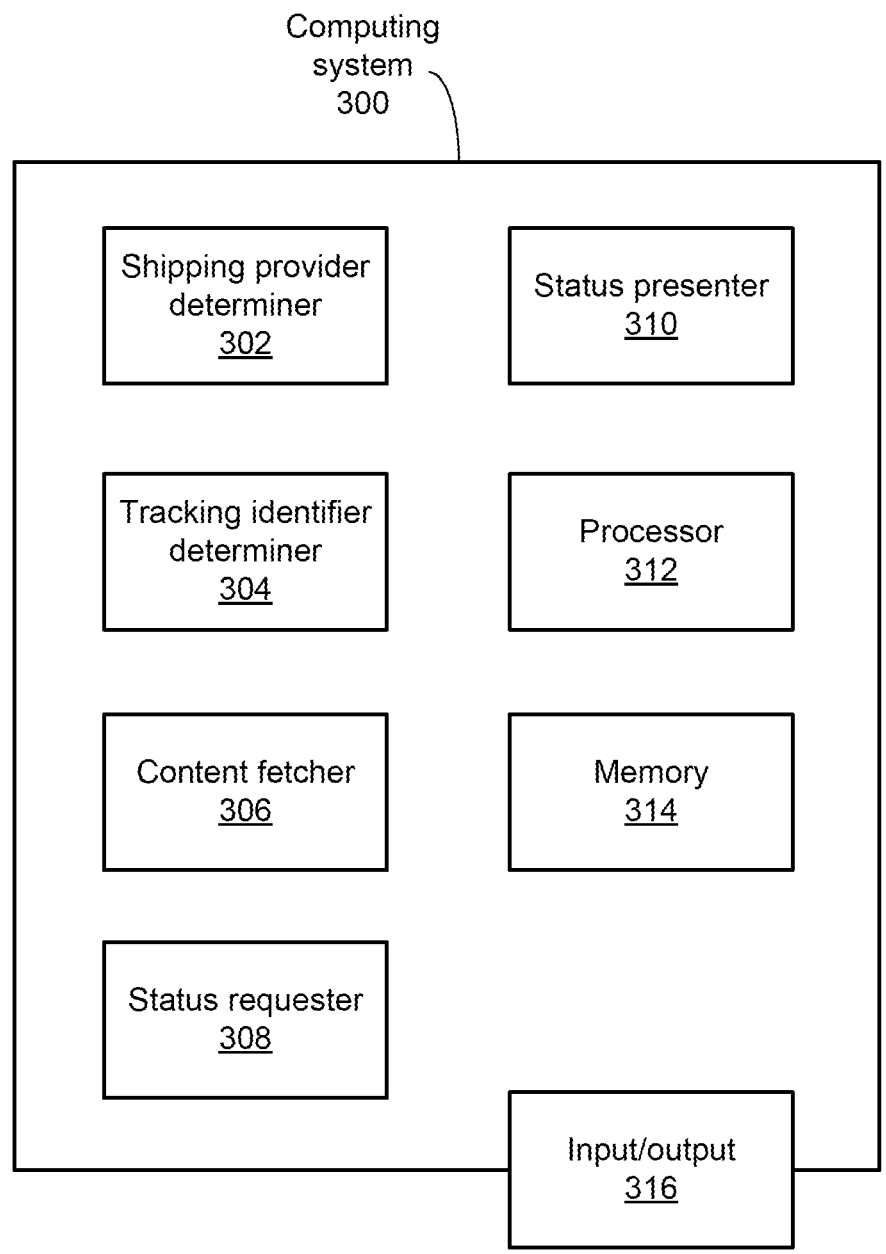
FIG. 3 is a block diagram of a computing system.

FIG. 3 is a block diagram of a computing system 300. The computing system 300 can include a computing system on which the browser 100 is executing, and/or a computing system in communication with the browser 100.

The computing system 300 can include a shipping provider determiner 302. The shipping provider determiner 302 can determine a shipping provider for a tracked item. The shipping provider determiner 302 can determine the shipping provider based, for example, on the domain included in a URL (such as the URL 108B) that the user entered into an address bar (such as the address bar 106) matching a domain included on a list of known shipping providers.

The computing system 300 can include a tracking identifier determiner 304. The tracking identifier determiner 304 can determine the tracking identifier, in association with the shipping provider, of an item ordered and/or tracked by the user. The tracking identifier determiner 304 can determine the tracking identifier based, for example, on the value included in the URL parameter of a URL, such as the value, "123456789" included in the URL 108B shown in FIG. 1C. The shipping provider determiner 302 and/or the tracking identifier determiner 304 individually or both also may be implemented by one or more regular expressions being matched against a URL.

In some examples, rather than determine the shipping provider(s) and tracking identifier(s) as the user enters addresses into the address bar, the shipping provider determiner 302 and tracking identifier determiner 304 can determine the shipping provider(s) and tracking identifier(s), respectively, based on collections of webpages visited by a user, such as via a browser history, search history, or search engine results page associated with the user. In some examples, the browser 100 could prompt the user to add the shipping provider and tracking identifier to a list of shipping providers and tracking identifiers stored by the computing system 300 in association with the user when the user visits the pages, such as when the computing system 300 presents the page shown in FIG. 1C to the user. In some examples, the shipping provider determiner 302 and tracking identifier determiner 304 can determine the shipping provider(s) and tracking identifier(s), respectively, based on emails received by an account associated with the user. In some examples, the shipping determiner 302 and/or tracking identifier determiner 304 can search emails for the shipping provider(s) and tracking identifier(s) in response to user request, such as the user selecting a button or link that prompts the shipping determiner 302 and/or tracking identifier determiner 304 to search the user's emails.

The computing system 300 can include a content fetcher 306. The content fetcher 306 can fetch content from a remote server. The content fetcher 306 can fetch content by, for example, sending a HyperText Transfer Protocol (HTTP) request to a server associated with a URL. The content fetcher 306 can initiate an HTTP request (such as a "GET") that includes the URL as a request header. In the example shown in FIG. 1A, the content fetcher 306 can send an HTTP request to the server associated with the domain, "shipper.com", and request the content associated with the subfolder and/or subdirectory, "tracking". In response to receiving the requested content, the computing system 300 can render and present the content, such as the content shown in the viewing panel 104 of FIG. 1A.

The computing system 300 can include a status requester 308. The status requester 308 can request, from a server associated with a shipping provider, a status of a shipped item. The status requester 308 can request the status by sending the tracking identifier associated with the item to the server associated with the shipping provider. The status requester 308 can receive the status from the shipping provider, such as a date on which the item arrived and/or was delivered, a date on which the item is expected to be delivered, or an indication that the date of arrival has not yet been determined.

The computing system 300 can include a status presenter 310. The status presenter 310 can provide and/or present statuses of tracked items to a user. The status presenter 310 can provide and/or present the statuses of the items for which the status requester 308 requested the statuses. The status presenter 310 can provide and/or present the statuses within a browser, such as within the viewing panel 104 of the browser 100 as shown in FIG. 2. In some examples, the computing system 300 can withhold presentation of some previously-tracked items, and/or stop tracking some previously-tracked items (such as by erasing the stored tracking identifier and/or shipping provider in association with the item) such as in response to request from a user (such as a user selecting a button or link) to hide and/or not track the status of the item. The user may, for example, desire to prevent other users from learning of the shipment and/or order of the item, so as not to ruin a surprise. In some examples, the computing system 300 can erase/delete tracking identifiers and/or shipping providers associated with items, such as a predetermined time (such as a month) after initial storage and/or a predetermined time (such as a week/month) after delivery of the item. The delivery of the item may be determined from the status information obtained by the status requester 308.

The computing system 300 can include at least one processor 312. The at least one processor 312 can execute instructions, such as instructions stored in at least one memory device 314, to cause the computing system 300 to perform any combination of methods, functions, and/or techniques described herein, such as implementing the browser 100 described herein.

The computing system 300 can include at least one memory device 314. The at least one memory device 314 can include a non-transitory computer-readable storage medium. The at least one memory device 314 can store data (such as shipping providers and tracking identifiers) and instructions thereon that, when executed by at least one processor, such as the processor 312, are configured to cause the computing system 300 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing system 300 can be configured to perform, alone, or in combination with the computing system 300, any combination of methods, functions, and/or techniques described herein.

The computing system 300 may include at least one input/output node 316. The at least one input/output node 316 may receive and/or send data, such as from and/or to, a server, and/or may receive input and provide output from and to a user. The input and output functions may be combined into a single node, or may be divided into separate input and output nodes. The input/output node 316 can include, for example, a display that renders the browser 100, a camera, a speaker, a microphone, a keyboard, a mouse, and/or one or more wired or wireless interfaces for communicating with other computing devices.

Figure 4:
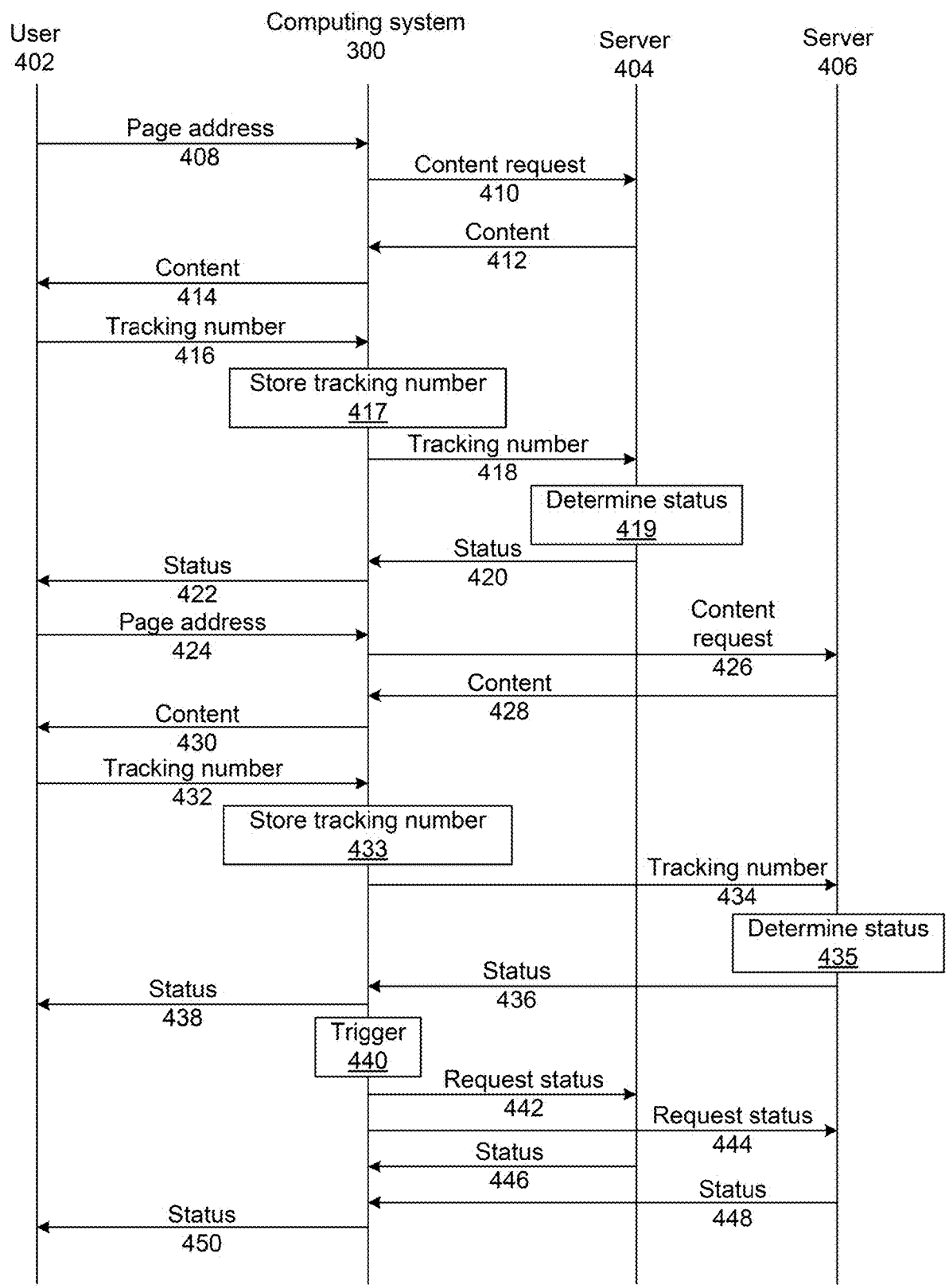
FIG. 4 is a timing diagram showing actions performed by a user, the computing system, and servers.

FIG. 4 is a timing diagram showing actions performed by a user 402, the computing system 300, and servers 404, 406. The actions can be associated with the user 402 requesting statuses of shipped items, and the computing system 300 presenting statuses of the shipped items to the user 402 without user request.

The user 402 may desire to determine the status of a first shipped item, and can enter and/or input a page address 408 into the computing system 300. The page address 408 can include a resource identifier, such as the URL 108A shown in FIG. 1A. In some examples, the user can type the resource identifier (e.g., URL 108A) into a keyboard included in the computing system 300.

The computing system 300 can respond to receiving the page address 408 from the user 402 by sending a content request 410 to a first server 404 associated with the domain included in the page address 408 received from the user. The content request 410 can include an Internet request, such a HyperText Transfer Protocol (HTTP) request (as used herein, HTTP requests include HyperText Transfer Protocol Secure (HTTPS) requests, and HTTP responses include HTTPS responses), for content and/or a file.

The first server 404 can respond to receiving the content request 410 from the computing system 300 by sending the requested content 412 to the computing system 300. The content 412 can include an HTTP response or HTTPS response, and can include a mark-up language (e.g., Hyper-Text Markup Language (HTML)) file and/or page.

The computing system 300 can respond to receiving the content 412 from the server 404 by presenting the content 414 to the user 402. The computing system 300 can present the content 414 to the user in the form of a webpage, such as the webpage shown in the viewing panel 104 of FIG. 1A.

The user can enter a tracking identifier 416 into the computing system 300. The user can, for example, type the tracking identifier 416 into a field included in the content 414 presented by the computing system, such as by entering the tracking identifier 124 into the field 122 shown in FIG. 1B. In some examples, the user could request a search engine to perform an Internet search with the name of the shipping provider and the tracking identifier. In some examples, the search engine may provide, as a search result, a UI element that the user could select and/or click on (e.g., a hyperlink, button, or other similar control) that submits a request that includes the domain name of the shipping provider and the query parameters including the tracking identifier. The request may include a URL similar to the URL 108B shown in FIG. 1C. In such an example, the browser may receive a response to the request and update the UI with the status information, e.g., in the search result page.

In response to receiving the tracking identifier, the computing system 300 can store the tracking identifier (417) in association with the shipping provider. In some examples, the computing system 300 can present the user 402 with the option to add the item to a list of tracked items and/or shipments associated with the user. In some examples, the computing system 300 can store, in association with the tracking identifier, a description of the item, an image representing the item (such as a picture of the item), or a cost of the item. In response to receiving the tracking identifier, the computing system 300 can also send the tracking identifier 418 to the first server 404.

In response to receiving the tracking identifier 418, the server 404 can determine the status (419) of the order associated with the tracking identifier 418. The server 404 can, for example, determine the status (419) by retrieving the status from a database in association with the tracking identifier 418. The first server 404 can send the determined status 420 to the computing system 300. The status 420 can include an HTTP response, and can include an HTML file indicating the status of the shipped item. In response to receiving the status 420, the computing system 300 can present the status 422 to the user 402, such as by presenting the status with text in the viewing panel 104 of the browser 100 as shown in FIG. 1C.

If the user 402 desires to check the status of a second item, the user 402 can enter a page address 424 into the computing system 300 in a similar manner to 408, the computing system 300 can send a content request 426 to a second server 406 associated with a domain included in the page address 424 in a similar manner to 410, the second server 406 can send the content 428 to the computing system 300 in a similar manner to 412, and the computing system 300 can present the content 430 to the user 402 in a similar manner to 414.

After viewing the content 430, the user 402 can enter the tracking identifier 432 in a similar manner to 416, the computing system 300 can store the tracking identifier (433) in a similar manner to (417), the computing system 300 can send the tracking identifier 434 to the second server 406 in a similar manner to 418, the second server 406 can determine the status (435) of the order in a similar manner to (419), and after determining the status (435), the second server 406 can send the status 436 to the computing system 300 in a similar manner to 420. In response to receiving the status 436, the computing system 300 can present the status 438 to the user 402 in a similar manner to 422. The user 402 can request, and the computing system 300 can present, the status of any identifier of shipped items.

The computing system 300 can later present the statuses of the shipped items without request from the user 402, e.g., without the user providing identification of the shipped items and/or the tracking identifier(s), and/or independently of any request from the user 402 or rendered browsing activity. In some examples, the computing system 300 can present the statuses of the shipped items in response to a trigger (440). The trigger can include, for example, the user 402 opening and/or launching the browser 100, opening and/or launching a new window of the browser 100, opening a new tab on the browser 100, selection of a specific button or menu option provided by the browser 100, and/or a user visiting a specific page on the browser 100. For example, the specific page may not be associated with a domain and/or URL, and/or may not include an Internet domain suffix (such as, ".com", ".org", or ".edu"), indicating that the specific page does not prompt the computing system 300 to request content associated with a URL but instead prompts the computing system 300 to call a specific function (in this example, presenting statuses of orders).

The computing system 300 can determine the statuses of the shipped items by requesting the statuses 442, 444 of the shipped items from the servers 404, 406. The computing system 300 requesting the statuses 442, 444 can include querying the servers 404, 406 maintained by the shipping provider for the statuses associated with the tracking identifiers. In some examples, the computing system 300 can query the servers 404, 406 for the statuses associated with the tracking identifiers by calling an application programming interface (API), with the tracking identifiers and/or identifiers of the shipping providers included as arguments in the API calls. The API may have been developed by the shipping providers, a manufacturer of the browser 100, or by a third party. The computing system 300 can request the statuses 442, 444 by sending the tracking identifiers stored at (417, 433) to the servers 404, 406. The servers 404, 406 can respond to receiving the requests for status 442, 446 by determining and sending the statuses 446, 448 to the computing system 300. The computing system 300 can respond to receiving the statuses 446, 448 by presenting the statuses 450 to the user 402. In some examples, the computing system 300 can present the statuses 450 to the user 402 by presenting the statuses 450 in the viewing panel 104 of the browser 100 as shown in the example of FIG. 2. In some examples, the computing system 300 can present the statuses to the user 402 by sending, to the user 402, an email or other electronic message that includes the statuses of the shipped items.

Figure 5:
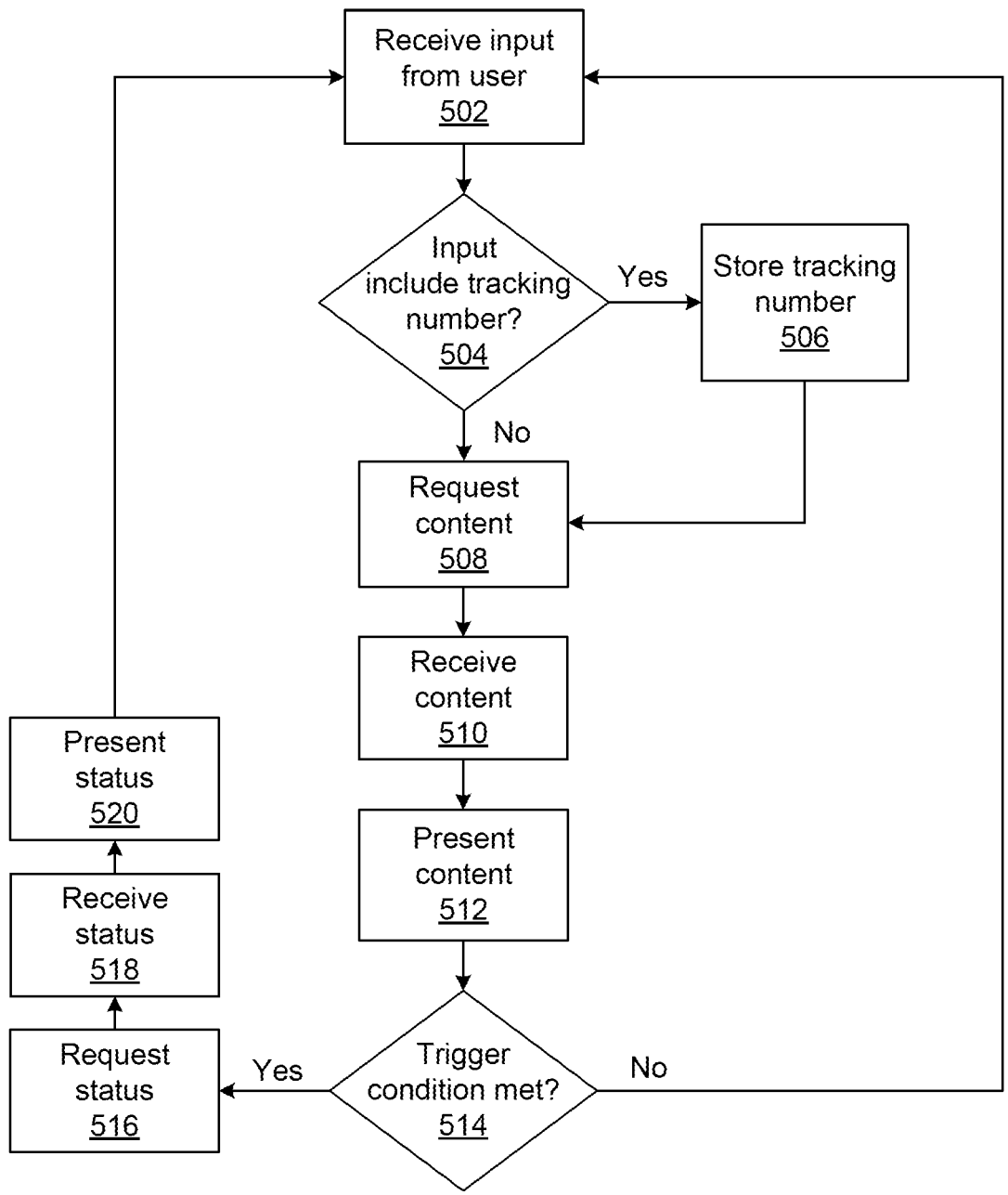
FIG. 5 is a flowchart showing functions performed by the computing system.

FIG. 5 is a flowchart showing functions performed by the computing system 300. The computing system 300 can receive input from a user 402 (502). In some examples, the computing system 300 can, for example, receive a URL, such as the URL 108B shown in FIG. 1C. The URL can be received as input into an address bar 106, as an HTTP request, or an HTTP response. In some examples, the computing system 300 can receive the tracking identifier from the user 402, via a field 122, and send the tracking identifier to the server maintained by the shipping provider and generate the URL 108B in response to the user entering the tracking identifier 124 (for example, "123456789") into the field 122. In some examples, the computing system 300 can receive, from the user 402, a search query that identifies the shipping provider and includes the tracking identifier.

The computing system 300 can determine whether the received input includes a tracking identifier (504). In some examples, the computing system 300 can determine whether the received input includes a tracking identifier (504) in conjunction with, and/or based on, determining that the received input identifies a shipping provider (such as based on the URL including a domain of a shipping provider included in a list of shipping providers stored and/or maintained by the computing system 300). In some implementations, the determination can be based, for example, on input to a field such as the field 122. In some implementations, the determination can be based on the page and/or URL included in the received input being associated with a known shipping provider and having the query parameter (such as the value, "123456789" in the example shown in FIG. 1C). In some implementations, the determination can be based on pattern matching of the query parameter. In some implementations, the determination can be based on matching a regular expression against the URL or against a value identified in the URL. In some implementations, a model trained to identify a tracking identifier in a URL may be used for the determination. In some implementations, the model may be trained to identify the tracking identifier and the shipping provider from the URL. If the computing system 300 determines that the received input does include a tracking identifier, then the computing system 300 can store the tracking identifier (506) in association with the shipping provider. After storing the tracking identifier (506), the computing system 300 can request content (508) from a server (such as either of the servers 404, 406 shown and described with respect to FIG. 4).

If the computing system 300 determines that the input does not include a tracking identifier, then the computing system 300 can request content (508) from a server. The requesting content (508) can include requesting content from, such as by sending an HTTP request to, a server associated with the domain included in the received input. The server can respond to the request for content by sending content, such as an HTML file included in an HTTP response, to the computing system 300.

The computing system 300 can receive the content (510), such as the HTML file, from the server. The computing system 300 can render and present the received content (512) to the user, such as by presenting the content in the viewing panel 104 of a browser 100 executing on the computing system 300.

While a browser, such as the browser 100, is executing on the computing system 300, the computing system 300 can determine whether a trigger condition has been met (514). Satisfaction of a trigger condition can prompt the browser 100 executing on and/or in communication with the computing system 300 to present statuses of orders and/or items independently of, and/or without, user request or rendered browsing activity. A trigger condition can include, for example, the browser 100 launching and/or a new tab on the browser 100 opening, such as in response to the user 402 selecting (such as by clicking on), the add button 112, or the user 402 visiting a specific page on the browser 100. If the computing system 300 determines that the trigger condition has not been met, then the computing system 300 can continue receiving input from the user 402 (502).

If the computing system 300 determines that the trigger condition has been met and/or satisfied, then the computing system 300 can initiate a process, such as by calling a function, to present statuses of orders to the user 402. The process can include the computing system 300 requesting statuses (516) of orders and/or shipped items associated with the user 402. Requesting the statuses (516) can include, for example, requesting the statuses 442, 444 by sending the tracking identifiers to the servers 404, 406, as shown and described in the example of FIG. 4. The computing system 300 can receive the statuses (518) from the servers, such as the received statuses 446, 448 as shown and described in the example of FIG. 4. The computing system 300 can present the status (520) of the orders and/or items to the user 402 (520), as shown and described in the examples of FIGS. 2 and 4.

Figure 6:
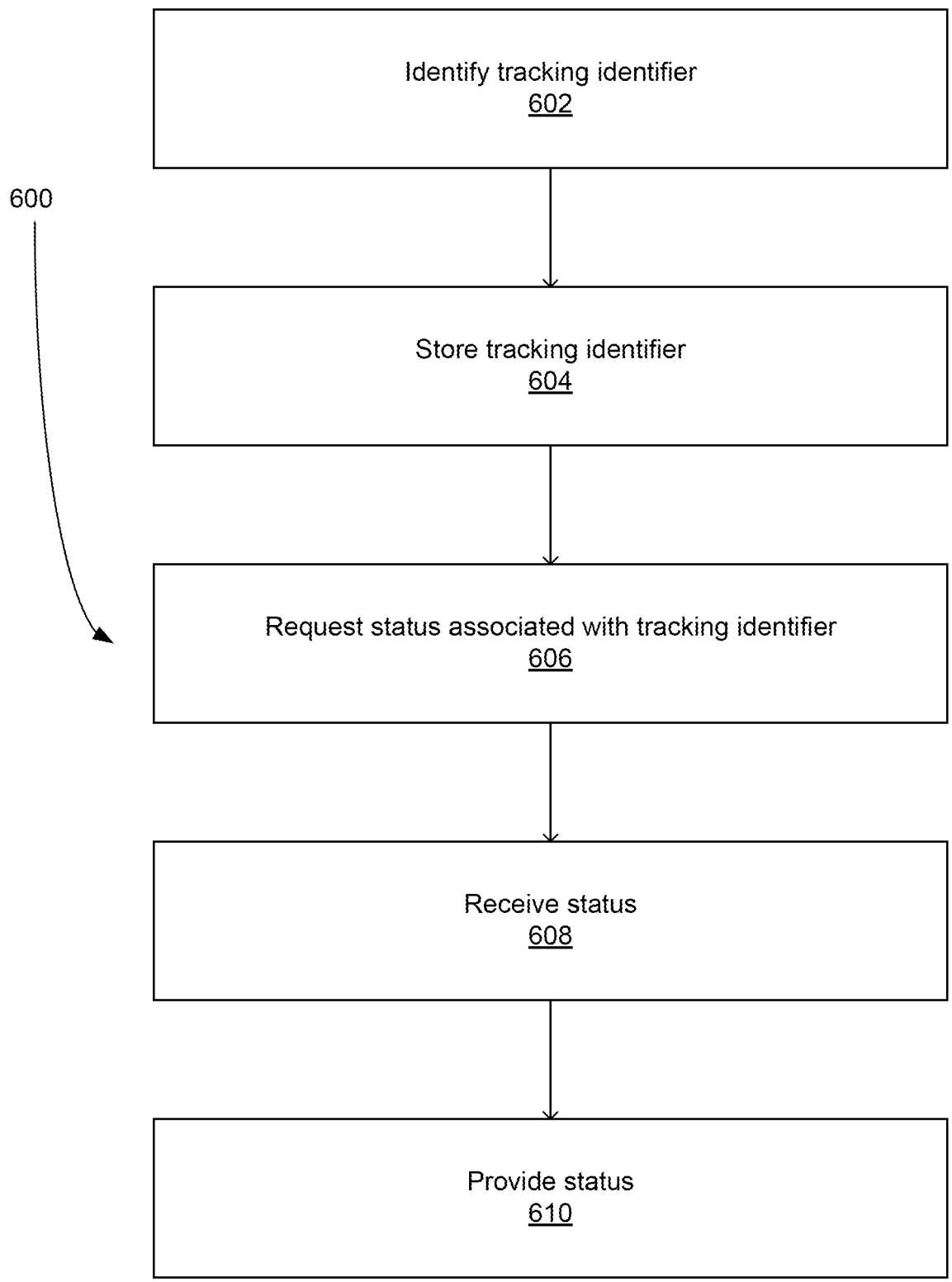
FIG. 6 is a flowchart showing a method performed by the computing system.

FIG. 6 is a flowchart showing a method 600 performed by the computing system. The method 600 can include identifying a tracking identifier (602), such as in a HyperText Transfer Protocol (HTTP) request or response by analyzing the request or the response. The method 600 can include storing the tracking identifier (604). The method 600 can include, independent of rendered browsing activity, requesting a status of an item associated with the tracking identifier (606). The status can indicate a location of the item. The method 600 can include receiving the status (608). The method 600 can include providing the status for display (610).

In some examples, the method 600 can be performed by a web browser, and the web browser can provide the status in response to a trigger.

In some examples, the trigger can include opening a new browser window.

In some examples, the trigger can include opening a new tab on a browser.

In some examples, the method 600 can further include erasing the tracking identifier in response to a request to hide the status of the item.

In some examples, the providing of the status (610) can include presenting the status to a user independently of the user requesting to visit a webpage associated with a shipping provider.

In some examples, the method 600 can further identifying a shipping provider included in the request or the response.

In some examples, requesting the status associated with the tracking identifier (606) can include querying the shipping provider for the status associated with the tracking identifier.

In some examples, determining the tracking identifier can include determining that an address included in the request or the response is associated with the shipping provider, and determining the tracking identifier based on a query parameter included in the address included in the request or the response.

In some examples, the identifying the shipping provider can include comparing a domain included in an address of the request to a list of domains associated with known shipping providers.

In some examples, the identification of the tracking identifier can include determining the tracking identifier based on a query parameter included in an address included in the request.

In some examples, the HTTP request can include a search request that includes the tracking identifier.

In some examples, the method 600 can be performed by a web browser, and the web browser can present the status in response to the web browser launching.

Some of the described implementations enable the identification of URLs, which relate to the tracking of shipments. Some of the implementations are related to the problem of tracking physical devices (shipments) through the physical world outside of a computing system, which corresponds to determining the location of physical items and is a technical problem being solved by the described implementations.

Figure 7:
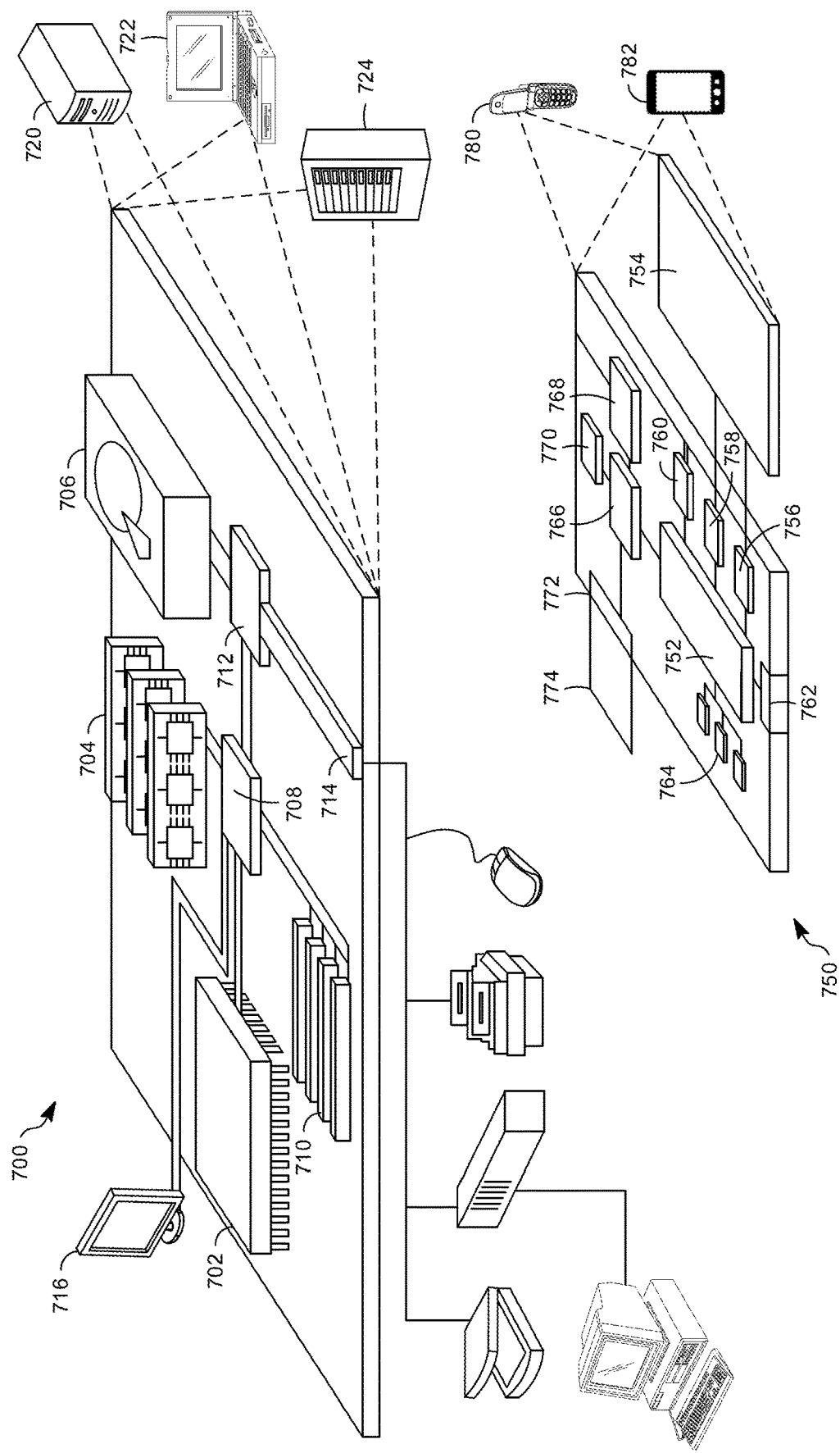
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed interface 708 manages bandwidth-intensive operations for the computing device 700, while the low speed controller 712 manages lower bandwidth-intensive operations. Such allocation of functions is exemplary only. In one implementation, the high-speed interface 708 is coupled to memory 704, display 716 (e.g., through a graphics processor or accelerator), and to high-speed expansion ports 710, which may accept various expansion cards (not shown). In the implementation, low-speed interface 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the embodiments described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
sending, by a web browser, a content request to a server associated with a domain;
determining a tracking identifier in the content request by analyzing the content request;
determining a shipping provider included in the content request by comparing the domain included in an address of the content request to a list of domains associated with known shipping providers;
storing, by the web browser, the tracking identifier;
in response to a trigger, requesting a status of an item associated with the tracking identifier, the trigger including a user opening a new tab on the web browser without entering a resource locator, the status indicating a location of the item;
receiving the status; and
providing the status for display in the new tab.

2. The method of claim 1, wherein opening the new tab includes opening the new tab in a new window of the web browser.

3. The method of claim 1, wherein the tracking identifier was stored in a memory and the method further comprises erasing the tracking identifier from the memory in response to a request to hide the status of the item.

4. The method of claim 1, wherein requesting the status associated with the tracking identifier includes querying the shipping provider for the status associated with the tracking identifier.

5. The method of claim 1, wherein the content request includes a search request that includes the tracking identifier.

6. The method of claim 1, wherein the new tab is opened in response to launching the web browser.

7. The method of claim 1, wherein determining the tracking identifier includes:
determining that the domain is associated with a shipping provider, the resource locator being included in the content request; and
determining the tracking identifier based on a query parameter included in the resource locator.

8. The method of claim 1, wherein opening the new tab on the web browser includes opening a page that is not associated with the domain.

9. The method of claim 1, wherein determining the tracking identifier includes determining the tracking identifier based on a parameter included in the content request, the content request including a special character indicating that the parameter follows the special character within the content request.

10. The method of claim 9, wherein the content request includes the special character, a key, and the parameter, the key indicating a name of the parameter and the parameter indicating a value of the tracking identifier.

11. The method of claim 1, wherein determining the tracking identifier includes determining the tracking identifier based on a parameter included in the content request, the content request including the domain followed by a special character and the parameter, the special character indicating that the parameter follows the special character within the content request.

12. The method of claim 11, wherein:
the status is a second status, and
the method further comprises:
receiving content in response to the content request, the content including a first status of the item; and
presenting the content in a form of a webpage.

13. A non-transitory computer-readable storage medium comprising instructions stored thereon that, when executed by at least one processor, are configured to cause a computing system to:
send, by a web browser, a content request to a server associated with a domain;
determine a tracking identifier in the content request by analyzing the content request;
determine a shipping provider included in the content request by comparing the domain included in an address of the content request to a list of domains associated with known shipping providers;
store, by the web browser, the tracking identifier;
in response to a trigger, request a status of an item associated with the tracking identifier, the trigger including a user opening a new tab on the web browser without entering a resource locator, the status indicating a location of the item;
receive the status; and
provide the status for display in the new tab.

14. The non-transitory computer-readable storage medium of claim 13, wherein the providing of the status includes providing the status independently of a user requesting to visit a webpage associated with a shipping provider.

15. The non-transitory computer-readable storage medium of claim 13, wherein determining the tracking identifier includes determining the identifier based on a parameter included in the content request, the content request including a special character indicating that the parameter follows the special character within the content request.

16. A computing system comprising:
at least one processor; and
a non-transitory computer-readable storage medium comprising instructions stored thereon that, when executed by the at least one processor, are configured to cause the computing system to:
send, by a web browser, a content request to a server associated with a domain;
determine a tracking identifier in the content request by analyzing the content request;
determine a shipping provider included in the content request by comparing the domain included in an address of the content request to a list of domains associated with known shipping providers;
store, by the web browser, the tracking identifier;
in response to a trigger, request a status of an item associated with the tracking identifier, the trigger including a user opening a new tab on the web browser without entering a resource locator, the status indicating a location of the item;
receive the status; and
provide the status for display in the new tab.

17. The computing system of claim 16, wherein the providing of the status includes providing the status independently of a user requesting to visit a webpage associated with a shipping provider.

18. The computing system of claim 16, wherein determining the tracking identifier includes determining the tracking identifier based on a parameter included in the content request, the content request including a special character indicating that the parameter follows the special character within the content request.

* * * * *